US010331928B2

(12) United States Patent
Creusot et al.

(10) Patent No.: US 10,331,928 B2
(45) Date of Patent: Jun. 25, 2019

(54) LOW-COMPUTATION BARCODE DETECTOR FOR EGOCENTRIC PRODUCT RECOGNITION

(71) Applicant: INTERNATIONAL BUSINESS MACHINES CORPORATION, Armonk, NY (US)

(72) Inventors: Clement D. M. Creusot, Tokyo (JP); Asim Munawar, Verena (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 43 days.

(21) Appl. No.: 14/934,953

(22) Filed: Nov. 6, 2015

(65) Prior Publication Data

US 2017/0132443 A1 May 11, 2017

(51) Int. Cl.
*G06K 7/14* (2006.01)
*G06K 7/10* (2006.01)

(52) U.S. Cl.
CPC ......... G06K 7/1443 (2013.01); G06K 7/1456 (2013.01); *G06K 7/10861* (2013.01); *G06K 7/14* (2013.01); *G06K 7/1452* (2013.01)

(58) Field of Classification Search
CPC ...... G06K 7/1443; G06K 7/14; G06K 7/1452; G06K 7/1456; G06K 7/1413; G06K 9/4604
See application file for complete search history.

(56) References Cited

U.S. PATENT DOCUMENTS

| 5,422,470 | A | * | 6/1995 | Kubo | ............... G06K 7/1417 235/462.09 |
|---|---|---|---|---|---|
| 8,366,004 | B2 | | 2/2013 | Li et al. | |
| 8,439,260 | B2 | | 5/2013 | Shi | |
| 8,608,073 | B2 | | 12/2013 | Baqai et al. | |
| 8,733,650 | B1 | | 5/2014 | Segal et al. | |
| 8,867,857 | B2 | | 10/2014 | Santos et al. | |

(Continued)

FOREIGN PATENT DOCUMENTS

JP 2016110196 A * 6/2016
WO 2014/0603836 A1 5/2014

OTHER PUBLICATIONS

Zamberletti, A. et al., "Neural 1D Barcode Detection Using the Hough Transform" Information and Media Technologies (2015) pp. 157-165, vol. 10, No. 1.

(Continued)

*Primary Examiner* — Christopher Stanford
(74) *Attorney, Agent, or Firm* — Tutunjian & Bitetto, P.C.; Vazken Alexanian

(57) ABSTRACT

A method of detecting a barcode that in one embodiment includes performing a line segment detection of a barcode image to provide a plurality of line segments, and analyzing the line segments using parallel segment detection to determine a best candidate line segment having a greatest similarity to a remainder of adjacent line segments. The method may further include providing a central bisector of the best candidate line segment, and forming a plurality of parallel lines offset from the central bisector. In a following step, a pixel map is from the central bisector and the plurality of the parallel lines, and an end and a start of the barcode is determined from changes in intensity of the pixels in the pixel map.

18 Claims, 8 Drawing Sheets

(56) References Cited

U.S. PATENT DOCUMENTS

| | | | |
|---|---|---|---|
| 2002/0084330 A1* | 7/2002 | Chiu | G06K 7/10 |
| | | | 235/462.11 |
| 2002/0162889 A1* | 11/2002 | Navon | G06K 7/14 |
| | | | 235/462.14 |
| 2012/0173347 A1* | 7/2012 | De Almeida Neves | ............. |
| | | | G06K 7/10861 |
| | | | 705/16 |
| 2013/0208006 A1* | 8/2013 | Lord | G06T 11/00 |
| | | | 345/633 |
| 2015/0001296 A1 | 1/2015 | Powers et al. | |
| 2015/0294129 A1* | 10/2015 | Aspert | G06K 7/1443 |
| | | | 235/462.1 |
| 2016/0154987 A1* | 6/2016 | Creusot | G06K 7/1443 |
| | | | 235/462.08 |

OTHER PUBLICATIONS

Gallo, O. et al., "Reading 1D Barcodes with Mobile Phones Using Deformable Templates" IEEE Transactions on Pattern Analysis and Machine Intelligence (Sep. 2011) pp. 1834-1843, vol. 33, No. 9.

Von Gioi, R. et al., LSD: a Line Segment Detector Image Processing on Line (2012) pp. 35-55, vol. 2.

Katona, M. et al., "A novel method for accurate and efficient barcode detection with morphological operations" 2012 Eighth International Conference on Signal Image Technology and Internet Based Systems IEEE (Nov. 25-29, 2012) pp. 307-314.

Barcode Scanner, https://play.google.com/store/apps/details?id=com.google.zxing.clie . . . , accessed Aug. 25, 2015, 1 page.

Zamberletti, A. et al., "Robust Angle Invariant 1D Barcode Detection" 2013 Second IAPR Asian Conference on Pattern Recognition (2013) pp. 160-164.

Wachenfeld, S. et al., "Robust Recognition of 1-D Barcodes Using Camera Phones" (Dec. 8-11, 2008) pp. 1-4.

Katona, M. et al., "Efficient 1D and 2D barcode detection using mathematical morphology" Mathematical Morphology and Its Applications to Signal and Image Processing (May 27-29, 2013) pp. 464-475.

Bodnar, P. et al., "A Novel Method for Barcode Localization in Image Domain" Proceedings of the 10th International Conference, ICIAR (Jun. 26-28, 2013) pp. 189-196.

Bodnar, P. et al., "Barcode Detection With Uniform Partitioning and Distance Transformation" Proceedings of the IASTED International Conference on Computer Graphics and Imaging, CGIM (2013) pp. 1-6.

Juett, J. et al., "Barcode Localization Using a Bottom Hat Filter" NSF Research Experience for Undergraduates, (2005) pp. 1-8.

Bodnar, P. et al., "Improving Barcode Detection with Combination of Simple Detectors" 2012 Eighth International Conference on Signal Image Technology and Internet Based Systems (2012) pp. 300-306.

\* cited by examiner

LOW-COMPUTATION BARCODE DETECTOR FOR EGOCENTRIC PRODUCT RECOGNITION

BACKGROUND

Technical Field

The present disclosure relates generally to barcodes and, in particular, the scanning of barcodes to read information.

Description of the Related Art

Barcodes are used to represent information in a manner that can be easily and automatically read by machines referred to as barcode readers. Accordingly, barcodes are utilized for a variety of different purposes, which range from tracking and identifying inventory items to identifying persons. Barcodes can be implemented as single dimension barcodes or as multi-dimensional barcodes.

SUMMARY

According to an aspect of the present principles, a method is provided for detecting a barcode. In some embodiments, the method of detecting a barcode may include performing a line segment detection of a barcode image; and analyzing the line segments using parallel segment detection to determine a best candidate line segment. The method may further include providing a central bisector of the best candidate line segment, and forming a plurality of parallel lines offset from the central bisector. A pixel map may be extracted from the central bisector and the plurality of the parallel lines. Intensity of the pixels in the pixel map are analyzed to provide an end and a start of the barcode.

According to another aspect of the present principles, a system is provided for detecting barcodes. In some embodiments, the system includes a line segment detection module for converting an image of a barcode into a plurality of line segments. The system may further include a parallel segment detection scorer that provides a plurality of line segments having similar geometry from the plurality of line segments, and a best candidate line segment. The system may further include a barcode end and start inference module that provides a central bisector of the best candidate line segment, and forming a plurality of parallel lines offset from the central bisector, wherein a pixel map may be extracted from the central bisector and the plurality of the parallel lines. From the intensity of the pixels in the pixel map the barcode end and start inference module determines an end and a start of the barcode.

In accordance with another aspect of the present disclosure a non-transitory article of manufacture is provided that tangibly embodies a computer readable program. In one embodiment, a non-transitory computer readable storage medium is provided that includes a computer readable program for detecting barcodes. The computer readable program when executed on a computer causes the computer to perform the steps of performing a line segment detection of a barcode image; and analyzing the line segments using parallel segment detection to determine a best candidate line segment. The method may further include providing a central bisector of the best candidate line segment, and forming a plurality of parallel lines offset from the central bisector. A pixel map may be extracted from the central bisector and the plurality of the parallel lines. Intensity of the pixels in the pixel map are analyzed to provide an end and a start of the barcode.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
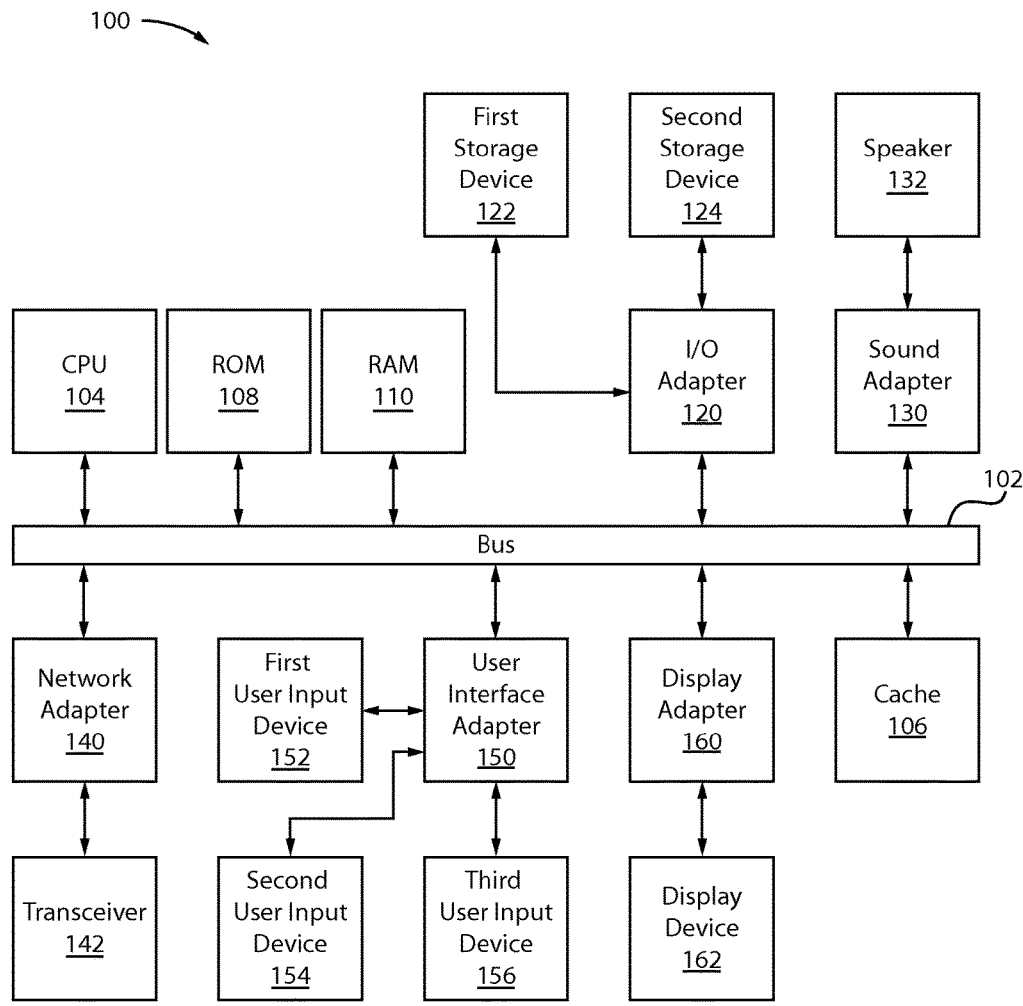
FIG. 1 shows an exemplary processing system to which the present principles may be applied, in accordance with an embodiment of the present principles.

The present principles are related to reading barcodes with a scanner. For the purposes of this disclosure, a "barcode" is a machine-readable representation of information that is converted into bits of data, such as 1's and 0's. The term "scanner" denotes a device including a light source, a lens and a photo conductor translating optical impulses into electrical ones. A one dimensional (1D) linear barcode may be perceived as the main tagging system for billions of product sold each year. In some examples, reading a barcode includes scanning the barcode with a laser scanner. Reading barcodes with a laser scanner from photographs or video can be problematic, and in some instances is only possible when the barcode is well framed inside the image. In some embodiments, the methods, systems and computer program products that are disclosed herein can provide a detector that is able to detect visible barcodes in general images without needing a lot of user interaction, e.g., user cooperation. For example, the detectors disclosed herein are suitable for use with user wearable cameras. The barcode detector of the present disclosure may be egocentric. The term "egocentric' means the user and the camera for scanning the barcode share the same center. The camera shows what the eyes of the user would see. In some embodiments, the detector provided by the methods, systems and computer program products of the present disclosure allows for a wide range of interactions with products using the object label. This includes getting information about the product, e.g., fact sheet, user review, promotions, synopsis, etc.; emitting information about the product, e.g., reviewing a product, signaling default, commenting price, etc.; as well as storing information, e.g., inventory, shopping list, and life-logging, etc. The methods, systems, and computer program products that are disclosed herein overcome a number of difficulties experienced by prior barcode scanning techniques. For example, some prior techniques employ Hough transform principles for the detection of the bars of the bard code. It has been determined that this can lead to the generation of false positive lines, which can result in barcode misdetection.

In some embodiments, contributions that can be provided by the methods, systems, and computer program products disclosed includes the use of parallel segment detection (PSD) to determined bars that are candidate for a barcode using the support of neighboring segments based on several pair wise distance threshold on angle, length and projected centers. In some embodiments, the methods, systems and structures disclosed herein also provide a method of detecting the barcode position along one bisector using a change accumulation function. In some embodiments, some of the steps of a method used by the barcode detector of the present disclosure include applying local segment detection (LSD) to a barcode image; applying parallel segment detection (PSD) scoring the barcode image; global (or local) maximum selection of the best segment and corresponding bisector; and inference of the barcode start and end using a change detection function. The methods, systems and structures of the present disclosure are now described in greater detail with reference to FIGS. 1-18.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100. For example, the user input devices 152, 154, 156 may provide a means for capturing a bar code image, such as a camera, video camera, optical scanner or combinations thereof.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
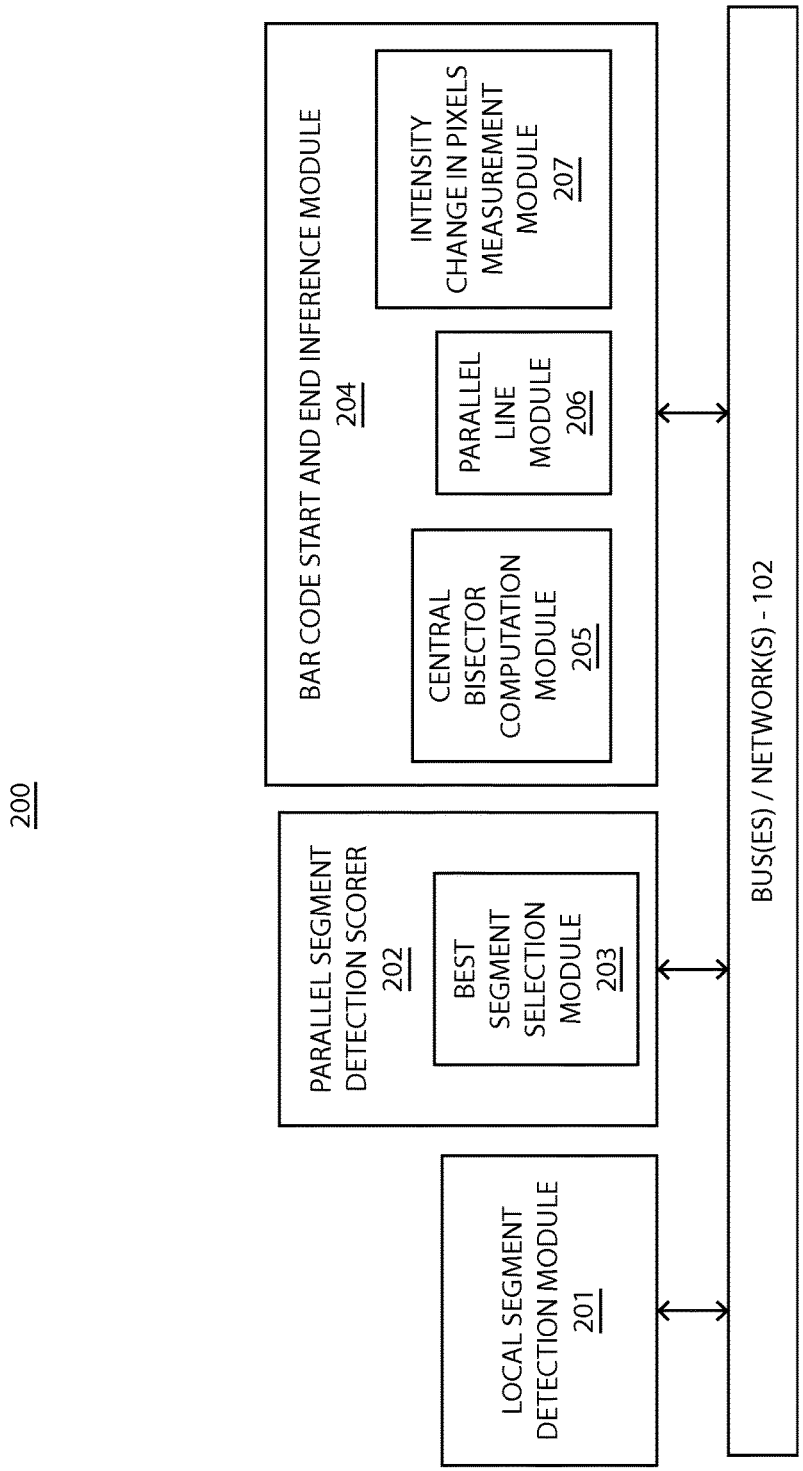
FIG. 2 is a block diagram illustrating an exemplary system for a barcode detector for product recognition, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200. Further, it is to be appreciated that processing system 100 may perform at least part of the method described herein including, for example, at least part of method 300 of FIG. 3.

FIG. 2 shows an exemplary system 200 for a barcode detector for egocentric product recognition, in accordance with an embodiment of the present principles. The system 200 includes at least a local segment detection (LSD) module 201, a parallel segment detection scorer 202, and a barcode start and end interference module 204. In some embodiments, the parallel segment detection scorer 202 includes a best segment selection module 203. In some embodiments, the barcode start and end interference module 204 includes a central bisector computation module 205, a parallel line module 206, and an intensity change in pixels measurement module 207. Each of the local segment detection (LSD) module 201, the parallel segment detection scorer 202, the best segment selection module 203, the barcode start and end interference module 204, the central bisector computation module 205, a parallel line module 206, and the intensity change in pixels measurement module 207 may be one or more modules of memory including a set of instructions and/or data to be executed by a hardware processor.

In the embodiment shown in FIG. 2, the elements thereof are interconnected by bus(es)/network(s) 102. However, in other embodiments, other types of connections can also be used. Moreover, in an embodiment, at least one of the elements of system 200 is processor-based, e.g., hardware processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 200 are readily determined by one of ordinary skill in the art, given the teachings of the present principles provided herein, while maintaining the spirit of the present principles.

Figure 3:
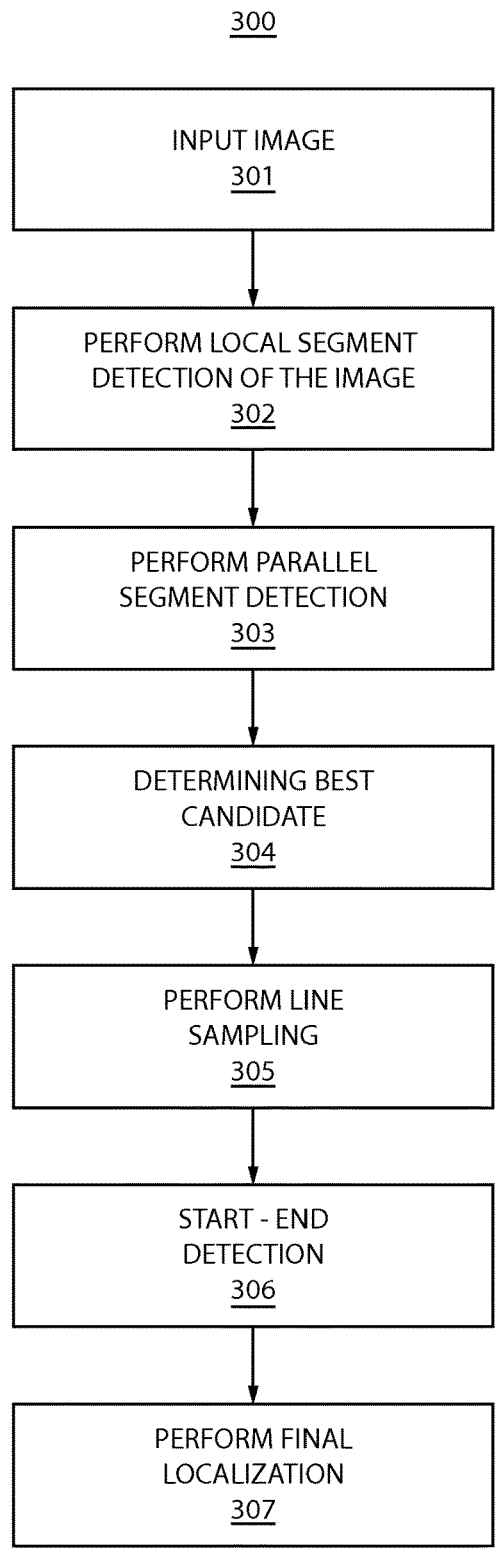
FIG. 3 is a flow/block diagram illustrating one embodiment of scanning a barcode for product recognition, in accordance with one embodiment of the present disclosure.

In some embodiments, the local segment detection module 201 provides the steps of inputting a barcode image and performing local segment detection of the image at step 301 of the method depicted in FIG. 3. The barcode image may be provided by one of the user input devices 152, 154, 156 that are described above with reference to FIG. 1. Local segment detection (LSD) is a linear-time line segment detector giving sub-pixel accurate results. The LSD detector provided by the local segment detection module 201 may work with any digital image, such as a digital image of a barcode, without parameter tuning. LSD is targeted at detecting locally straight contours on images, which may be referred to as "line segments". Counters are zones of the image where the gray level is changing fast enough from the dart to light or the opposite.

Figure 4:
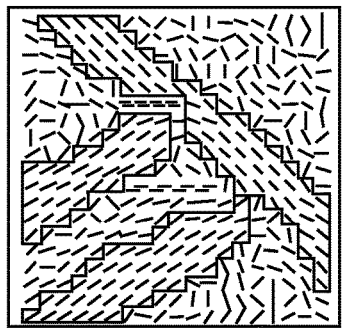
FIG. 4 is an image of a scanned barcode, in accordance with one embodiment of the present disclosure.

Before detection by the LSD detector, the method may include inputting an image of a barcode at step 301 of the method depicted in FIG. 3. For example, the process may start with a raw image of a two-dimensional barcode, possibly attached to an item or document, as depicted in FIG. 4. The image can be obtained as digital image date from the two-dimensional barcode by means of, e.g., digital cameras, wearable cameras, video cameras, CCD cameras, scanners and the like. In some embodiments, the image can be further processed by a thresholding operation, in which the raw digital input is subject to the thresholding operation for the purpose of binarizing the input image. The image may also be subjected to a dilatation process, in which the thresholded image data is subjected to dilation and hole filling. This provides consistency to the lines of the barcode image. It is noted that the above operations are only some examples of processing that may be provided to an original raw image of the barcode to prepare the image of the barcode for local segment detection by the detector. It is noted that the above operations are only examples, and are not intended to limit the present disclosure. For example, further operations and processes that may be performed prior to the image being subjected to LSD detection by the local segment detection module 201 have been described in WO2014/06836 to Sheible et al., which is incorporate herein by reference.

Figure 5:
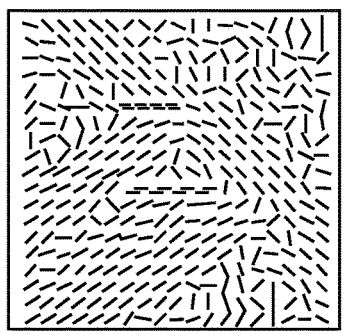
FIG. 5 is an image of pixels from the scanned barcode, in accordance with one embodiment of the present disclosure.
Figure 6:
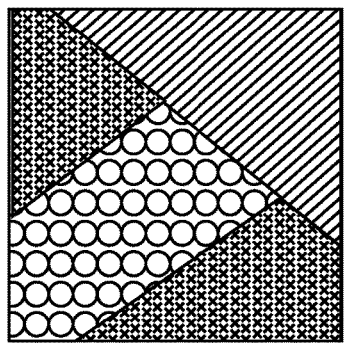
FIG. 6 is a sketch of one embodiment of a level-line field, in accordance with the principles of the present disclosure.
Figure 7:
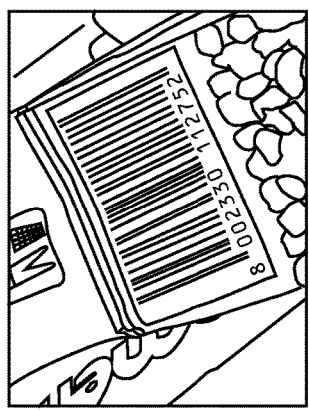
FIG. 7 is a sketch of one embodiment of line support regions, in accordance with the principles of the present disclosure.
Figure 8:
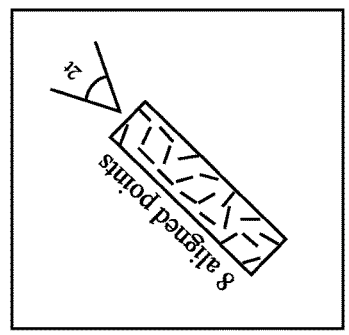
FIG. 8 is a schematic illustrating aligned points of pixels in a rectangular shape, in accordance with some aspects of the present disclosure.

In some embodiments, the local segment detection module 201 performs local segment detection of the image at step 301 of the method depicted in FIG. 3. The algorithm starts by computing the level-line angle at each pixel of the image of the barcode to produce a level-line field, i.e., a unit vector field such that all vectors are tangent to the level line through their base point. FIG. 5 depicts one embodiment of pixels from the scanned barcode, and FIG. 6 depicts one embodiment of a level-line field. Then, this field is segmented into connected regions of pixels that share the same level-line angle up to a certain tolerance T. These connected regions are called line support regions. FIG. 7 depicts one embodiment of line support regions. In some embodiments, each line support region (a set of pixels) may be a candidate for a line segment. In some embodiments, the corresponding geometrical object (a rectangle in this case) must be associated with it. The principal inertial axis of the line support region is used as main rectangle direction; the size of the rectangle is chosen to cover the full region. Each rectangle may be subject to a validation procedure. The pixels in the rectangle whose level-line angle corresponds to the angle of the rectangle up to a tolerance $\tau$ are called aligned points, as depicted in FIG. 8. In some embodiments, the total number of pixels in the rectangle, n, and its number of aligned points, k, are counted and used to validate or not the rectangle as a detected line segment.

The validation step may be based on the contrario approach and the Helmholtz principle. Further details on the contrario approach and the Helmholtz principle are found in Agnes Desolneux, Lionel Moisan, Jean-Michel Morel, *Meaningful Alignments, International Journal of Computer Vision*, vol. 40, no. 1, pp. 7-23, 2000, and Agnes Desolneux, Lionel Moisan, Jean-Michel Morel, *From Gestalt Theory to Image Analysis, a Probabilistic Approach*, Springer 2008. ISBN: 0387726357, which are both included herein by reference. For example, the Helmholtz principle states that no perception (or detection) should be produced on an image of noise. Accordingly, the contrario approach proposes to define a noise or contrario model $H_0$ where the desired structure is not present. Then, an event is validated if the expected number of events as good as the observed one is small on the contrario model. The structured events are denied as being rare in the contrario model.

In the case of line segments, in some embodiments, the number of aligned points may be of particular interest. For example, the analysis can consider the event that a line segment in the contrario model has as many or more aligned points, as in the observed line segment. For example, given an image i and a rectangle r, we will note k(r; i) the number of aligned points and n(r) the total number of pixels in r. Then, the expected number of events which are as good as the observed one is can be provided with equation (1), as follows:

$$N_{test} \cdot P_{H_0[k(r,I) \geq k(r,i)]} \qquad \text{Equation (1):}$$

where the number of tests $N_{test}$ is the total number of possible rectangles being considered, $P_{H_0}$ is the probability on the a contrario model $H_0$, and I is a random image following $H_0$. The $H_0$ stochastic model fixes the distribution of the number of aligned points k(r, I), which only depends on the distribution of the level-line field associated with I. Thus, $H_0$ is a noise model for the image gradient orientation rather than a noise model for the image. Note that k(r, I) is an abuse of notation as I does not corresponds to an image but to a level-line field following $H_0$. Nevertheless, there is no contradiction as k(r, I) only depends on the gradient orientations.

The a contrario model $H_0$ used for line segment detection is therefore defined as a stochastic model of the level-line field satisfying the following properties:

a) $\{LLA(j)\}_{j \in Pixels}$ is composed of independent random variables b) LLA(j) is uniformly distributed over $[0, 2\pi]$ where LLA(j) is the level-line angle at pixel j. Under hypothesis $H_0$, the probability that a pixel on the a contrario model is an aligned point is $p=\tau/\pi$ and, as a consequence of the independence of the random variables LLA(j), k(r, I) follows a binomial distribution. Thus, the probability term $P_{H_0}[k(r, I) \geq k(r, i)]$ is given by equation (2), as follows:

$$P_{H_0[k(r,I) \geq k(r,i)]} = B(n(r),k(r,i),p) \qquad \text{Equation (2):}$$

where B(n, k, p) is the tail of the bimodal distribution, as follows $$B(n,k,p) = \Sigma_{j=k}^{n} \binom{n}{j} p^j (1-p)^{n-j} \qquad \text{Equation (3):}$$

Figure 9:
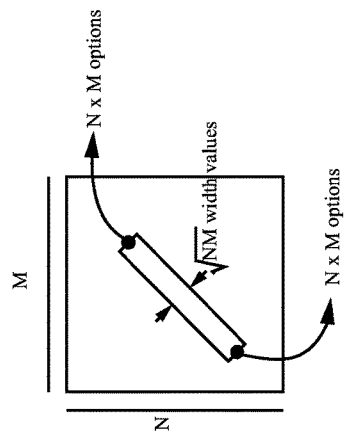
FIG. 9 is a schematic illustrating a number of tests in accordance with one embodiment of a local segment detection (LSD) method.

The number of tests $N_{test}$ corresponds to the total number of rectangles that could show an alignment at a fixed precision. It is noted that the rectangles are oriented, meaning that the order of their starting and ending points is not arbitrary: it encodes which side of the line segment is darker. Thus, a rectangle from point A to point B is a different test from the rectangle from point B to point A. The exhaustive scenario is to take all the rectangles starting and ending at image pixels. In an N×M image this gives NM×NM different rectangles. Further, $\sqrt{NM}$ different width values are considered for each one. FIG. 9 depicts schematically the variables for the above described estimation of the number of tests. For example, the number of rectangles considered may be equal to $(NM)^{5/2}$.

In some embodiments, the Number of False Alarms (NFA) associated with a rectangle r on the image i may be defined as equation (4), as follows:

$$NFA(r,i) = (NM)^{5/2} \gamma \cdot \beta(n(r),k(r,i),p) \qquad \text{Equation (4):}$$

The above corresponds to the expected number of rectangles which have a sufficient number of aligned points to be as rare as r under $H_0$. When the NFA associated with an image rectangle is large, this means that such an event is expected on the contrario model, i.e., common and thus not a relevant one. When the NFA value is small, the event is rare and probably a meaningful one. A threshold $\epsilon$ is selected and when a rectangle has NFA (r, i) it is called $\epsilon$-meaningful rectangles and produces a detection.

Figure 10:
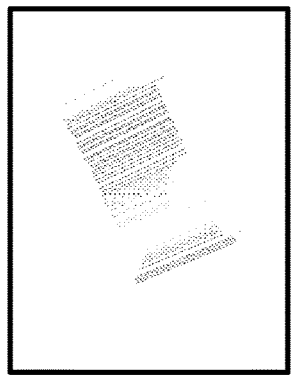
FIG. 10 is a schematic of the scanned barcode image depicted in FIG. 4 following local segment detection (LSD), in accordance with one embodiment of the present disclosure.

FIG. 10 depicts one embodiment of a line detection using a line segment detector as provided by the line segment detection module 201 of the system depicted in FIG. 2 that is applied to an image of a barcode, in which the detected line segments correspond empirically straight structures in the barcode image.

Further details regarding line segment detection (LSD) may be found in R. Grompone von Gioi, J. Jakubowicz, J. Morel, and G. Randall, *LSD: A Line Segment Detector, Image Processing on Line,* 2 (2012), pp. 35-55., which may be incorporated herein by reference.

Referring to FIG. 2, the system 200 for barcode detecting for egocentric product recognition includes a parallel segment detection scorer 202. In some embodiments, the parallel segment detection scorer 202 performs the step of parallel segment detection at step 303 of the method depicted in FIG. 3. In some embodiments, parallel segment detection (PSD) determines which bars from the line segments of the barcode provided by the line segment detection module 201 are candidates for barcode detection. Parallel segment detection determines which bars are candidates for barcode detection using the support of neighboring segments based on several pair-wise distance thresholds on angle, length and projected centers. Parallel segment detection (PSD) loops over all line segments $s_i$, and assigns a score for each of the line segments. In some embodiments, the score assigned is the number of other local segments $s_k$ that are similar to the line segment $s_i$ being analysed. In one embodiment, the score for the number of local segments that are similar can be provided by equation (5), as follows:

$$v(s_i) = \Sigma_{k \in N_i} (\delta_{ik}^\alpha \delta_{ik}^\rho \delta_{ik}^x) \qquad \text{Equation (5):}$$

The deltas, i.e., $\delta_{ik}^\alpha$, $\delta_{ik}^\rho$, $\delta_{ik}^x$, are binary values that depend on three similar measurements, e.g., height, width, and pitch, defined by a threshold provided by equation (6), as follows:

$$\delta_{ik}^x = \begin{cases} 1, & \text{if } D^x(i,k) < T^x, \\ 0, & \text{otherwise.} \end{cases} \qquad \text{Equation (6)}$$

Wherein T is a threshold for each D, and each D is are different types of distance. The above equations take into account the angles of the line segments, the length of the line segments and the offset of adjacent line segments at their center. In accordance with the above calculations, the segments that have the highest scores are surrounded by many segments that are substantially equal, i.e., they look alike, in manner of segment length, angle and offset. Each of the line segments having the highest scores according to equations (5) and (6), as measured by the parallel segment detection (PSD) loops may be considered as part of the barcode.

Figure 11:
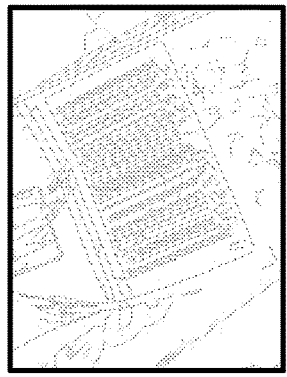
FIG. 11 is a schematic of the scanned barcode image depicted in FIG. 4 following parallel segment detection (PSD), in accordance with one embodiment of the present disclosure.

FIG. 11 depicts a plurality of parallel line segments from the line segments defined in FIG. 10, which were form from scanned barcode image depicted in FIG. 4 following parallel segment detection (PSD), in accordance with step 303 of the method illustrated in FIG. 3. Each of the line segments depicted in FIG. 11 are similar in length, angle and offset, as measured using Equations (5) and (6), e.g., as measured by the parallel line segment detection scorer 202 depicted in FIG. 2.

Figure 12:
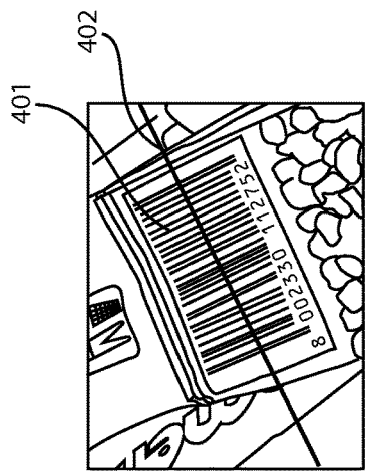
FIG. 12 is a picture depicting the selection of a best candidate for the barcode image, in accordance with one embodiment of the present disclosure.

The parallel line segment detection scorer 202 may also determine the best candidate from the parallel line segment analysis at step 304 of the method illustrated in FIG. 3. The best candidate of the line segments is selected by a best segment selection module 203 of the parallel line segment detection scorer 202 according to the highest ranking as determined using Equations (5) and (6). FIG. 12 illustrates the line segment of the barcode from the grouping of barcodes identified by the parallel line segment detection scorer 202 that provides the best candidate 401, in accordance with one embodiment of the present disclosure.

Referring to FIG. 2, the system 200 for barcode detecting for egocentric product recognition includes a barcode start and end interference module 204. In some embodiments, for the best candidate 401 of the line segments produced by best line segment selection module 203 of the parallel line segment detection scorer 202 is used to compute a central bisector 402 for the barcode. The bisector of a segment is the unique line that is perpendicular to the segment and passes through the center of the segment. One example of a central bisector 402 is depicted in FIG. 12. The central bisector 402 may be computed by a central bisector computation module 205 of the barcode start and end interference module 204.

Figure 13:
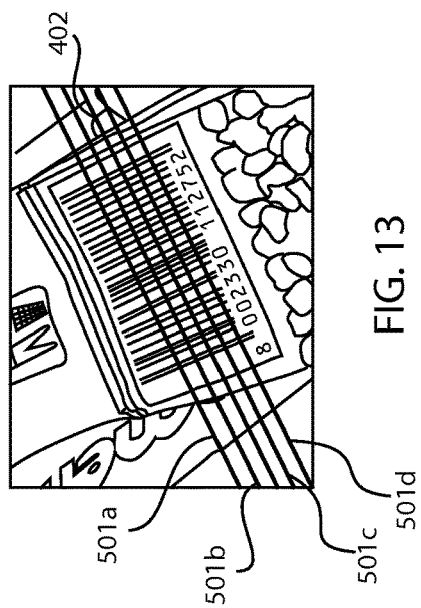
FIG. 13 is a picture depicting the pixel line sampling for the barcode image, in accordance with one embodiment of the present disclosure.

The barcode start and end interference module 204 also includes a module for computing a plurality of parallel lines 501a, 501b, 501c, 501d to the central bisector 402, which are offset from the central bisector, which can be referred to as a parallel line module 205. The parallel lines are simply offset from the bisector along the segment. The offsets are defined as percentage of the segment length. FIG. 13 depicts one embodiment of parallel lines, e.g., four parallel lines 501a, 501b, 501c, 501d, on a barcode image offset from the central bisector 402, as computed by the parallel line module 206 of the barcode start and end interference module 204.

The central bisector 402 and the parallel lines 501a, 501b, 501c, 501d of the barcode image that are depicted in FIGS. 12 and 13, may provide step 305 of the method illustrated in FIG. 3, and may be referred to as the step of performing line sampling.

In some embodiments, the barcode start and end interference module 204 extracts a pixel intensity plot for each of the bisector and parallel lines, e.g., central bisector 402, and parallel lines 501a, 501b, 501c, 501d, and computing a function to measure the difference of intensity changes on the left and right of each point on the pixel intensity plot. In one embodiment, computing the aforementioned function may include Equation (7), as follows:

$$\Phi_{L_i(k)} = \Sigma_{j=k}^{k-L_i} \|L_i(k) - L_i(j-1)\| - \Sigma_{j=k}^{k+L_i} \|L_i(j) - L_i(j+1)\| \quad \text{Equation (7):}$$

Li(k) is the value of the k-th value along the i-th signal. In some embodiments, computing the function to measure the difference in intensity, e.g., using Equation (7), can be provided by the intensity change in pixels measurement module 207. In some embodiments, the min and max of the mean of function Phi Φ can be computed as the beginning and the end of the barcode.

In some embodiments, extracting the pixel intensity plot for each of the bisector and parallel lines; computing a function to measure the difference of intensity changes on the left and right of each point on the pixel intensity plot; and computing the min and max of the mean of function Phi Φ in accordance with Equation (7) can provide the start-end depiction step 306 of the method illustrated in FIG. 3

Figure 14:
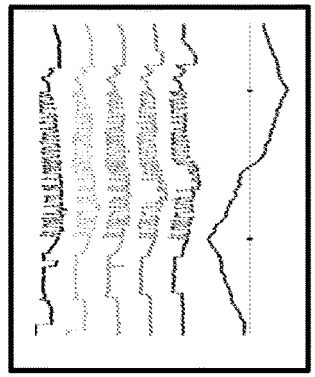
FIG. 14 is a schematic depicting the phi $\Phi$ function in conjunction with the start-end detection for the barcode image, in accordance with one embodiment of the present disclosure.
Figure 15:
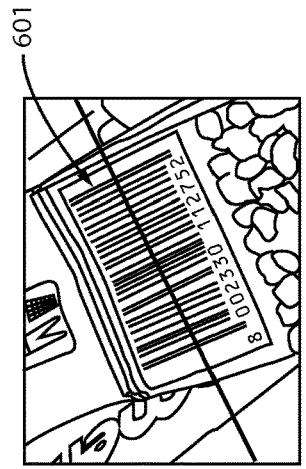
FIG. 15 is a picture depicting the final localization for the barcode image, in accordance with one embodiment of the present disclosure.

FIG. 14 is a schematic depicting the phi Φ function in conjunction with the start-end detection for the barcode image. The abscissa represents the length along the bisector, and the ordinate represent the pixel intensity values for each curves. The bottom curve represent the final phi Φ function with the start and end marked as dots. This can allow for determination of the final rotated rectangle 601 containing the barcode, as depicted in FIG. 15. This can provide for the step of final localization of the barcode as step 307 of the method depicted in FIG. 3.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 16:
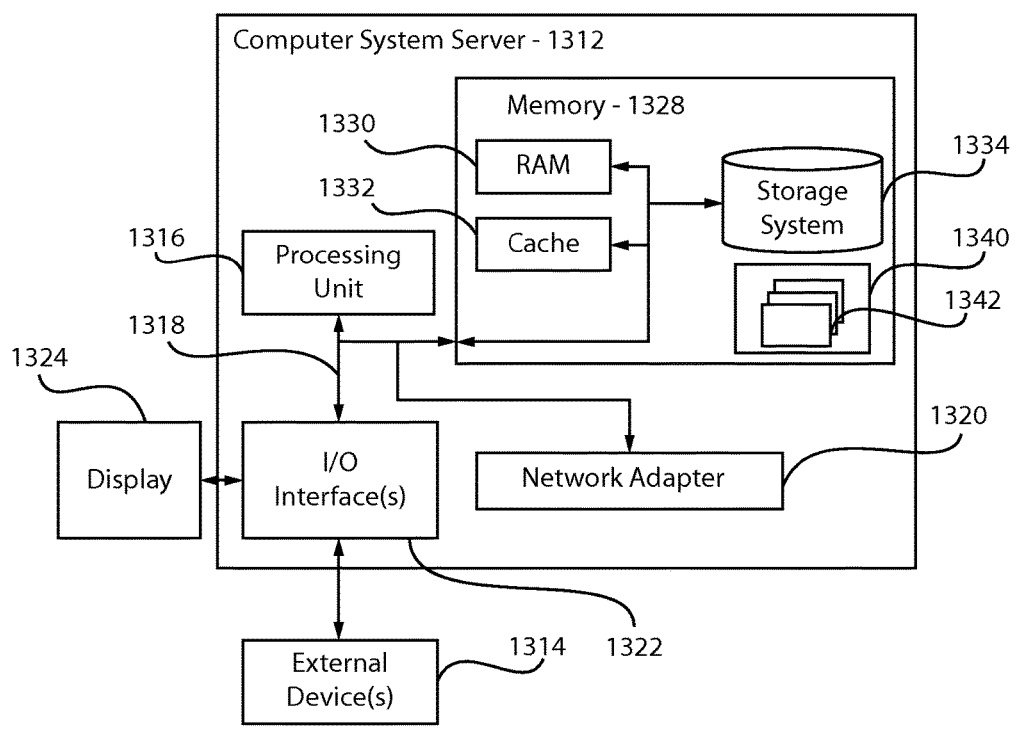
FIG. 16 shows an exemplary cloud computing node, in accordance with an embodiment of the present principles.

Referring now to FIG. 16, a schematic of an example of a cloud computing node 1310 is shown. Cloud computing node 1310 is only one example of a suitable cloud computing node and is not intended to suggest any limitation as to the scope of use or functionality of embodiments of the invention described herein. Regardless, cloud computing node 1310 is capable of being implemented and/or performing any of the functionality set forth hereinabove.

In cloud computing node 1310 there is a computer system/server 1312, which is operational with numerous other general purpose or special purpose computing system environments or configurations. Examples of well-known computing systems, environments, and/or configurations that may be suitable for use with computer system/server 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 1312 in cloud computing node 1310 is shown in the form of a general-purpose computing device. The components of computer system/server 1312 may include, but are not limited to, one or more processors or processing units 1316, a system memory 1328, and a bus 1318 that couples various system components including system memory 1328 to processor 1316.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1312 typically includes a variety of computer system readable media. Such media may be any available media that is accessible by computer system/server 1312, and it includes both volatile and non-volatile media, removable and non-removable media.

System memory 1328 can include computer system readable media in the form of volatile memory, such as random access memory (RAM) 1330 and/or cache memory 1332. Computer system/server 1312 may further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1318 by one or more data media interfaces. As will be further depicted and described below, memory 1328 may include at least one program product having a set (e.g., at least one) of program modules that are configured to carry out the functions of embodiments of the invention.

Program/utility 1340, having a set (at least one) of program modules 1342, may be stored in memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the invention as described herein. For example, the program modules 1342 can include the modules described with reference to FIG. 2.

Computer system/server 1312 may also communicate with one or more external devices 1314 such as a keyboard, a pointing device, a display 1324, etc.; one or more devices that enable a user to interact with computer system/server 1312; and/or any devices (e.g., network card, modem, etc.) that enable computer system/server 1312 to communicate with one or more other computing devices. Such communication can occur via Input/Output (I/O) interfaces 1322. Still yet, computer system/server 1312 can communicate with one or more networks such as a local area network (LAN), a general wide area network (WAN), and/or a public network (e.g., the Internet) via network adapter 1320. As depicted, network adapter 1320 communicates with the other components of computer system/server 1312 via bus 1318. It should be understood that although not shown, other hardware and/or software components could be used in conjunction with computer system/server 1312. Examples, include, but are not limited to: microcode, device drivers, redundant processing units, external disk drive arrays, RAID systems, tape drives, and data archival storage systems, etc.

Figure 17:
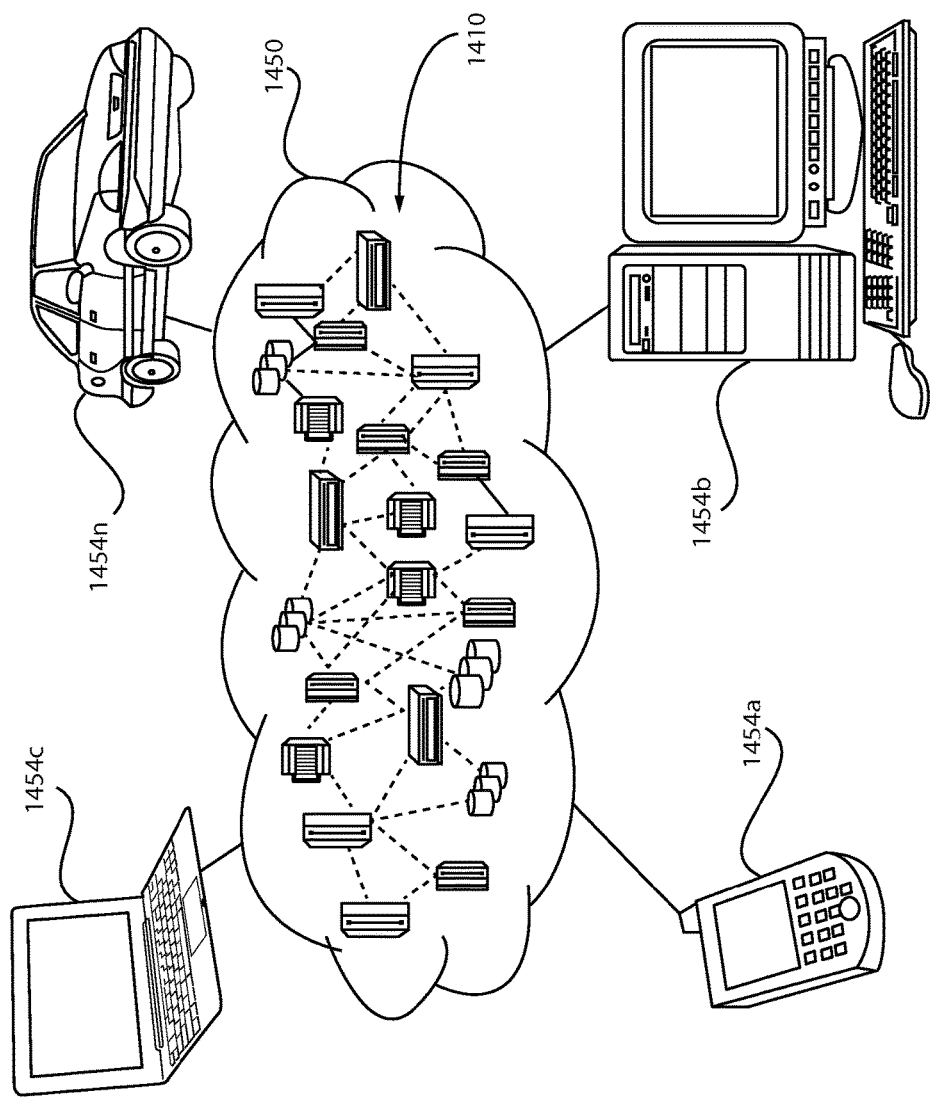
FIG. 17 shows an exemplary cloud computing environment, in accordance with an embodiment of the present principles.

Referring now to FIG. 17, illustrative cloud computing environment 1450 is depicted. As shown, cloud computing environment 1450 comprises one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 17 are intended to be illustrative only and that computing nodes 1410 and cloud computing environment 1450 can communicate with any type of computerized device over any type of network and/or network addressable connection (e.g., using a web browser).

Figure 18:
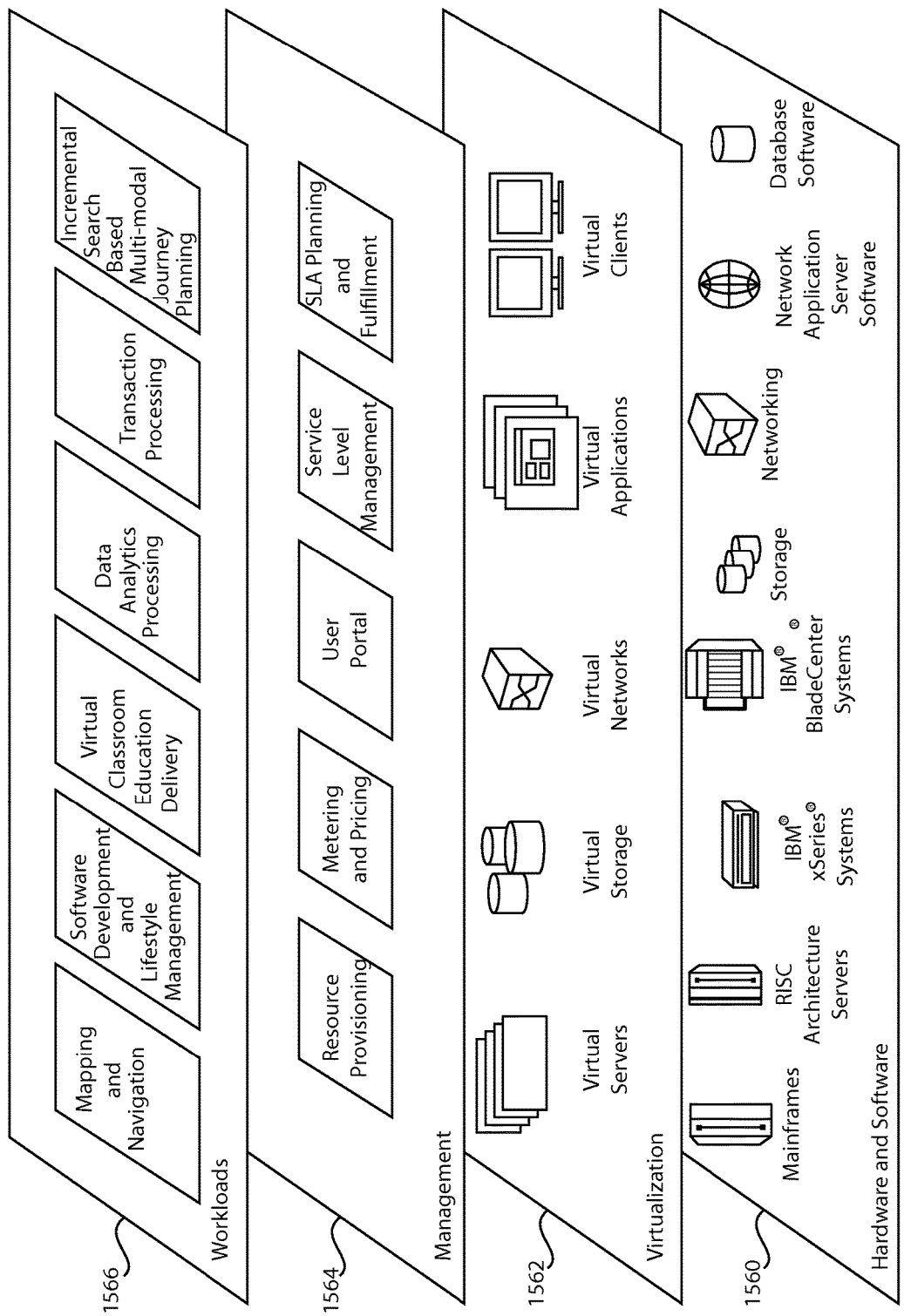
FIG. 18 shows exemplary abstraction model layers, in accordance with an embodiment of the present principles.

Referring now to FIG. 18, a set of functional abstraction layers provided by cloud computing environment 1550 (FIG. 16) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 1560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1562 provides an abstraction layer from which the following examples of virtual entities may be provided: virtual servers; virtual storage; virtual networks, including virtual private networks; virtual applications and operating systems; and virtual clients.

In one example, management layer 1564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and providing a low-computation barcode detector for egocentric product recognition.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method of detecting a barcode comprising:
performing a line segment detection using a scanner applied to a barcode from an image taken by a camera to provide a plurality of line segments for the barcode;
analyzing the line segments using parallel segment detection based on pair wise distance measurements between the line segments to determine a best candidate line segment using a hardware processor of the scanner based on a selected line segment having a greatest similarity to a remainder of adjacent line segments in said plurality of line segments, the greatest similarity being between at least one of a line segment height, a line segment width, line segment angle, a line segment spacing or a combination thereof for the selected line segment, and at least one of a line segment height, a line segment width, a line segment angle, a line segment spacing or a combination thereof for said remainder of said adjacent line segments in said plurality of line segments;
providing a central bisector of the barcode of the best candidate line segment;
forming a plurality of parallel lines offset from the central bisector;
extracting a pixel map from the central bisector and the plurality of the parallel lines; and
measuring a barcode end and a barcode start of the barcode from changes in intensity of pixels in the pixel map read by the scanner, wherein the scanner reading the barcode from the image determines a high concentration of pixels to be the barcode start of the barcode relative to an image background at a first end of the central bisector and a low concentration of pixels to be the barcode end of the barcode relative to the image background at a second end of the central bisector.

2. The method of claim 1, wherein the barcode image is scanned from a photograph or video.

3. The method of claim 1, wherein the barcode image is offset from a center of the image and is angled within the image.

4. The method of claim 1, wherein each of the line segments selected during said analyzing the line segments using parallel segment detection are substantially parallel to one another.

5. The method of claim 1, wherein said providing the central bisector of the best candidate line segment comprises a line that is central to a height of the best candidate line segment, and has a length that is perpendicular to the height of the best candidate line segment.

6. The method of claim 5, wherein the plurality of the parallel lines are parallel to the length of the center of the central bisector of the best candidate line segment, wherein at least one of the plurality of the parallel lines is on a first side of the central bisector, and at least one of the plurality of the parallel lines is on a second side of the central bisector that is opposing the first side of the central bisector.

7. A system for detecting barcodes comprising:
a scanner for capturing a barcode from an image taken by a camera;
a line segment detection module for converting the image of a barcode into a plurality of line segments;
a parallel segment detection scorer that provides using pair wise distance measurements a plurality of line segments having similar geometry from the plurality of line segments, and a best candidate line segment that is determined using parallel segment detection, the best candidate line segment having greatest similarity to said plurality of line segments, the greatest similarity being between at least one of a line segment height, a line segment width, a line segment angle, a line segment spacing or a combination thereof for the best candidate line segment, and at least one of a line segment height, a line segment width, a line segment angle, a line segment spacing or a combination thereof for a remainder of adjacent line segments in said plurality of line segments; and
a barcode end and start inference module that provides a central bisector of the best candidate line segment for the barcode, forms a plurality of parallel lines offset from the central bisector, and extracts a pixel map from the central bisector and the plurality of the parallel lines, wherein from the intensity of the pixels in the pixel map, the barcode end and start inference module determines using the scanner a high concentration of pixels to be the barcode start of the barcode relative to an image background at a first end of the central bisector and a low concentration of pixels to be the barcode end of the barcode relative to the image background at a second end of the central bisector.

8. The system of claim 7, wherein the image of the barcode is scanned from a photograph or video.

9. The system of claim 8, wherein the barcode in the image is offset from a center of the image and is angled within the image.

10. The system of claim 7, wherein the parallel segment detection scorer provides said plurality of line segments having similar geometry from the plurality of line segments by analyzing the line segments comprising analyzing line segment height, line segment width, line segment angle, line segment pitch or a combination thereof.

11. The system of claim 7, wherein each of said plurality of line segments having similar geometry are substantially parallel to one another.

12. The system of claim 7, wherein the central bisector of the best candidate line segment comprises a line that is central to a height of the best candidate line segment, and has a length that is perpendicular to the height of the best candidate line segment.

13. The system of claim 12, wherein the plurality of the parallel lines are parallel to the length of the central of the central bisector of the best candidate line segment, wherein at least one of the plurality of the parallel lines is on a first side of the central bisector, and at least one of the plurality of the parallel lines is on a second side of the central bisector that is opposing the first side of the central bisector.

14. A non-transitory computer readable storage medium comprising a computer readable program for detecting bar codes, wherein the computer readable program when executed on a computer causes the computer to perform the steps of:
performing a line segment detection using a scanner applied to a barcode from an image taken by a camera to provide a plurality of line segments for the barcode;
analyzing the line segments using parallel segment detection based on pair wise distance measurements between the line segments to determine a best candidate line segment using a hardware processor of the scanner based on a selected line segment having a greatest similarity to a remainder of adjacent line segments in said plurality of line segments, the greatest similarity being between at least one of a line segment height, a line segment width, line segment angle, a line segment spacing or a combination thereof for the selected line segment, and at least one of a line segment height, a line segment width, a line segment angle, a line segment spacing or a combination thereof for said remainder of said adjacent line segments in said plurality of line segments;
providing a central bisector of the barcode of the best candidate line segment;
forming a plurality of parallel lines offset from the central bisector;
extracting a pixel map from the central bisector and the plurality of the parallel lines; and
measuring a barcode end and a barcode start of the barcode from changes in intensity of pixels in the pixel map read by the scanner, wherein the scanner reading the barcode from the image determines a high concentration of pixels to be the barcode start of the barcode relative to an image background at a first end of the central bisector and a low concentration of pixels to be the barcode end of the barcode relative to the image background at a second end of the central bisector.

15. The non-transistor computer readable storage medium of claim 14, wherein the computer readable program for detecting bar codes receives an input barcode image that is scanned from a photograph or video.

16. The non-transistor computer readable storage medium of claim 14, wherein the barcode image is offset from a center of the image and is angled within the image.

17. The non-transistor computer readable storage medium of claim 14, wherein each of the line segments selected during said analyzing the line segments using parallel segment detection are substantially parallel to one another.

18. The non-transistor computer readable storage medium of claim 14, wherein said providing the central bisector of the best candidate line segment comprises a line that is central to a height of the best candidate line segment, and has a length that is perpendicular to the height of the best candidate line segment.

* * * * *